(12) United States Patent
Bernardo Gavito et al.

(10) Patent No.: US 11,295,003 B2
(45) Date of Patent: Apr. 5, 2022

(54) GENERATING A UNIQUE RESPONSE TO A CHALLENGE

(71) Applicant: QUANTUM BASE LIMITED, Cheshire (GB)

(72) Inventors: Ramon Bernardo Gavito, Lancaster (GB); Jonathan David Roberts, Lancaster (GB); Utz Alfred Fritz Roedig, Lancaster (GB); Robert James Young, Lancaster (GB)

(73) Assignee: QUANTUM BASE LIMITED, Cheshire (GB)

( * ) Notice: Subject to any disclaimer, the term of this patent is extended or adjusted under 35 U.S.C. 154(b) by 407 days.

(21) Appl. No.: 16/320,545

(22) PCT Filed: Mar. 3, 2017

(86) PCT No.: PCT/GB2017/050574
§ 371 (c)(1),
(2) Date: Jan. 25, 2019

(87) PCT Pub. No.: WO2018/020201
PCT Pub. Date: Feb. 1, 2018

(65) Prior Publication Data
US 2019/0272368 A1 Sep. 5, 2019

(30) Foreign Application Priority Data
Jul. 27, 2016 (GB) ...................................... 1613002

(51) Int. Cl.
*G06F 21/00* (2013.01)
*G06F 21/44* (2013.01)
(Continued)

(52) U.S. Cl.
CPC .............. *G06F 21/44* (2013.01); *G06F 21/73* (2013.01); *G09C 1/00* (2013.01);
(Continued)

(58) Field of Classification Search
CPC .. G06F 21/44; G06F 21/73; G06F 2221/2103; G06F 2221/2129; G06F 7/58; G09C 1/00; H04L 2209/12; H04L 9/3278
See application file for complete search history.

(56) References Cited

U.S. PATENT DOCUMENTS 3,311,884 A * 3/1967 Mengel .................... G06F 7/58
708/251
10,132,858 B2 * 11/2018 Vanhoucke ........ G01R 31/2836
(Continued)

FOREIGN PATENT DOCUMENTS

JP 2005018500 A * 1/2005
JP 2005018500 A 1/2005
(Continued)

OTHER PUBLICATIONS

J, Roberts, "Using Quantum Confinement to Uniquely Identify Devices", Nov. 10, 2015, England Nature Publishing Group, vol. 5. (Year: 2015).*
(Continued)

*Primary Examiner* — Jeremy S Duffield
*Assistant Examiner* — Hassan A Hussein
(74) *Attorney, Agent, or Firm* — Hoffman Warnick LLC

(57) ABSTRACT

According to a first aspect of the invention, there is provided a device for generating a unique response to a challenge, the device comprising: a plurality of structures, each structure exhibiting quantum mechanical confinement, and each structure being arranged to provide a unique response when challenged with an electrical measurement, the unique response being linked to the atomic makeup of the structure that defines the quantum mechanical confinement; the device being arranged to facilitate a challenge of at least two structures of the plurality in electrical combination to generate the unique response, by facilitating an electrical measurement of an output of the at least two structures of the
(Continued)

plurality in electrical combination; the unique response being derivable from the electrical measurement.

14 Claims, 7 Drawing Sheets

(51) Int. Cl.
*G06F 21/73* (2013.01)
*G09C 1/00* (2006.01)
*H04L 9/32* (2006.01)

(52) U.S. Cl.
CPC ........... *G06F 2221/2103* (2013.01); *G06F 2221/2129* (2013.01); *H04L 9/3278* (2013.01); *H04L 2209/12* (2013.01)

(56) References Cited

U.S. PATENT DOCUMENTS

| | | | |
|---|---|---|---|
| 10,148,435 B2* | 12/2018 | Young | G06N 10/00 |
| 10,862,679 B2* | 12/2020 | Young | H04L 9/0866 |
| 2003/0162587 A1* | 8/2003 | Tanamoto | H01L 29/7888 |
| | | | 463/22 |
| 2008/0231418 A1* | 9/2008 | Ophey | G02B 27/00 |
| | | | 340/5.85 |
| 2009/0083833 A1* | 3/2009 | Ziola | H04L 9/3278 |
| | | | 726/2 |
| 2011/0163088 A1* | 7/2011 | Besling | H04L 9/3278 |
| | | | 219/660 |
| 2012/0179952 A1* | 7/2012 | Tuyls | H04L 9/002 |
| | | | 714/768 |
| 2012/0183135 A1* | 7/2012 | Paral | H04L 9/0866 |
| | | | 380/44 |
| 2013/0142329 A1* | 6/2013 | Bell | H04L 9/0877 |
| | | | 380/44 |
| 2013/0276151 A1* | 10/2013 | Lewis | H04L 9/0866 |
| | | | 726/34 |
| 2014/0108786 A1* | 4/2014 | Kreft | H04L 9/0643 |
| | | | 713/156 |
| 2014/0328481 A1* | 11/2014 | Morioka | H04L 9/0816 |
| | | | 380/28 |
| 2015/0058928 A1* | 2/2015 | Guo | H04L 63/0876 |
| | | | 726/3 |
| 2015/0070979 A1* | 3/2015 | Zhu | G11C 11/1695 |
| | | | 365/158 |
| 2015/0229482 A1* | 8/2015 | Pinkse | H04L 9/0852 |
| | | | 380/28 |
| 2015/0286914 A1* | 10/2015 | Kulikovska | B42D 25/23 |
| | | | 235/488 |
| 2016/0085961 A1* | 3/2016 | Tanamoto | G06F 21/44 |
| | | | 726/19 |
| 2016/0323096 A1* | 11/2016 | Kara-Ivanov | G06F 21/73 |
| 2017/0038807 A1* | 2/2017 | Bittlestone | G06F 21/73 |
| 2020/0186368 A1* | 6/2020 | Roberts | H04L 9/3278 |

FOREIGN PATENT DOCUMENTS

| | | | | |
|---|---|---|---|---|
| JP | 2005293489 A | * | 10/2005 | |
| JP | 2005293489 A | | 10/2005 | |
| KR | 20160141813 A | * | 12/2016 | ............ G09C 1/00 |
| WO | WO-2007046018 A1 | * | 4/2007 | ............ G09C 1/00 |
| WO | 2015150739 A1 | | 10/2015 | |
| WO | WO-2015150739 A1 | * | 10/2015 | ............ G06N 10/00 |

OTHER PUBLICATIONS

Romeira, B, "Mixed mode oscillations in a forced optoelectronic circuit for pattern and random bit generation", Sep. 2014, IEEE/IET Electronic Library, (Year: 2014).*

GB Search and Examination Report in connection with corresponding GB Application No. 1613002.3 dated Sep. 13, 2016, 7 pages.

Roberts et al., "Using Quantum Confinement to Uniquely Identify Devices," Scientific Reports 5, 16456; doi: 10.1038/srep16456, 2015, 8 pages.

Young et al., "Using quantum effects in nanomaterials for unique identification," SPIE Newsroom, 2015, 3 pages.

* cited by examiner

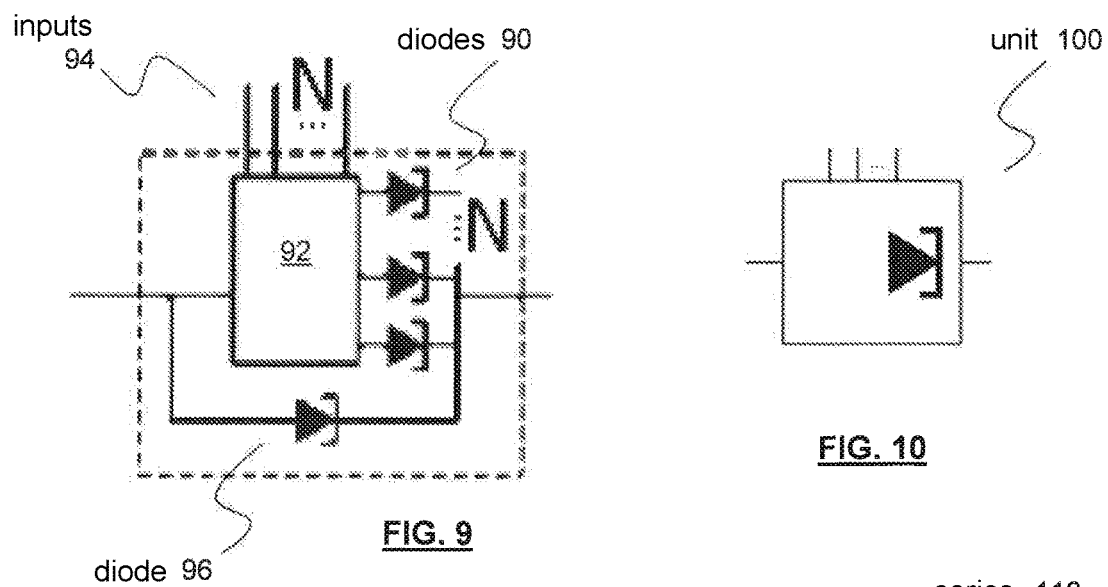
FIG. 9
FIG. 10
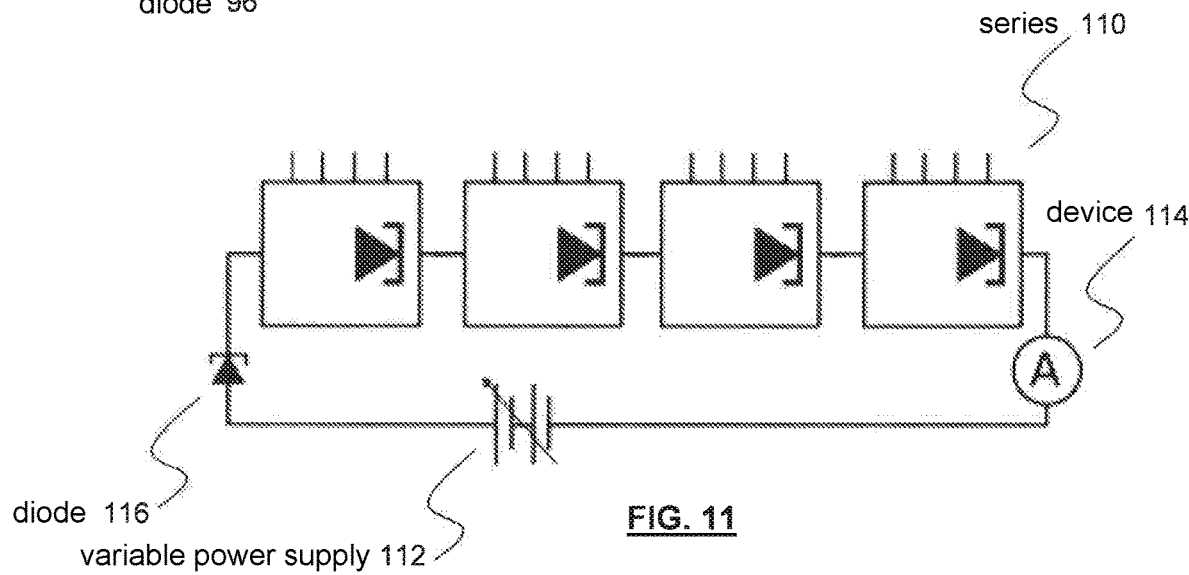
FIG. 11
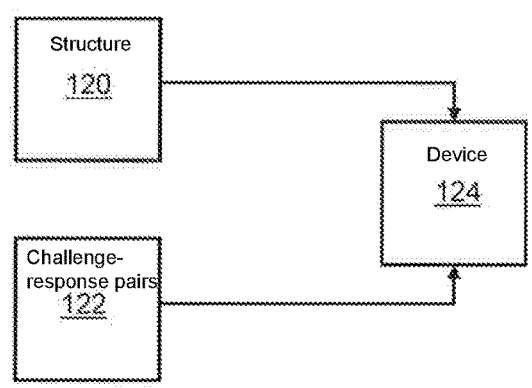
FIG. 12

GENERATING A UNIQUE RESPONSE TO A CHALLENGE

The present invention relates generally to generating a unique response to a challenge, in terms of a device for such generating, and a method of such generating. The device and method use a plurality of structures that each exhibit quantum mechanical confinement, in order to generate the unique response.

Many modern systems base security of communications, functionality, or similar on a unique identifier, typically stored locally. Such security might be critical in such systems, or might simply provide additional functionality in others. The authentication of an entity might also depend on such a unique identifier, for example in terms of anti-counterfeiting. A unique identifier may be alternatively or additionally defined or described as a key, or a cryptographic key, or as something that provides a unique response when challenged. Alternatively or additionally, such a unique identifier or unique response might be used as a key, or a cryptographic key.

To be robust, it is of course important that a cryptographic key or similar identifier has a high degree of uniqueness, a term used in the art. "Unique" might mean that it is statistically improbable that the unique key or similar identifier might be stumbled across randomly, at least in a practical timeframe relative to use of the system in question. Not only this, it is also important that it is difficult for a potential attacker of the cryptography to clone or otherwise compromise that key or similar identifier. In more practical terms, it is also desirable that the device providing the key or similar identifier has a small physical and power consumption footprint, while at the same time having a low fabrication cost.

The unique identification of products leaving a manufacturer or the like can be managed by tagging or fingerprinting those products, specifically by including a unique, difficult to clone (physical) function that can easily and repeatedly be read. A physically (sometimes referred to as physical) unclonable function (PUF) can provide such identification, for example in terms of providing a unique response to a challenge. This physically unclonable function can be or can provide the key or similar identifier mentioned above.

Typically, a physically unclonable function is provided on the basis of what would commonly be considered as macroscopic, or classical physical principles. For instance, a physically unclonable function may be based on minute changes in quartz crystal oscillation frequency between different crystals, or the different capacitances between different devices as a result of different thicknesses of layers constituting those different devices, or the identification of anomalies (e.g. dead cells) in an array of memory cells. There is little doubt that these approaches do work in practice, to an extent. However, they do, nevertheless, have disadvantages. It has been realised that a main reason for these disadvantages is the utilisation of macroscopic effects in the generation of the unique identifier. For instance, this might limit the uniqueness of the identifier, or make it more difficult to in some way measure, encode or otherwise define the unique identifier. Also, using macroscopic effects, repeatability and consistency in the determination or generation of a unique identifier may sometimes be compromised, or require significant space or power consumption in a device that provides the identifier.

Even if a physically unclonable function is provided on the basis of quantum mechanical effects, the nature and effectiveness of devices employing or using such effects could be improved. For example, the uniqueness of responses could be improved, in terms of the strength, uniqueness or number of such responses.

It is an example aim of example embodiments of the present invention to at least partially obviate or mitigate at least one disadvantage of the prior art, whether identified herein or elsewhere, or to at least provide an alternative to the prior art.

According to the present invention there is provided an apparatus and method as set forth in the appended claims. Other features of the invention will be apparent from the dependent claims, and the description which follows.

According to a first aspect of the invention, there is provided a device for generating a unique response to a challenge, the device comprising: a plurality of structures, each structure exhibiting quantum mechanical confinement, and each structure being arranged to provide a unique response when challenged with an electrical measurement, the unique response being linked to the atomic makeup of the structure that defines the quantum mechanical confinement; the device being arranged to facilitate a challenge of at least two structures of the plurality in electrical combination to generate the unique response, by facilitating an electrical measurement of an output of the at least two structures of the plurality in electrical combination; the unique response being derivable from the electrical measurement.

The unique response of the at least two structures when challenged in combination may be different to an addition of each unique response from the same two structures if each were challenged in isolation.

The unique response may be different in so far as that it is impossible to determine the unique response of the at least two structures in combination from knowledge of each unique response of each of the two structures in isolation.

Facilitating an electrical measurement comprises facilitating an electrical measurement of the output of at least two of the structures when the structures are electrically connected or connectable in parallel and/or series.

The plurality of structures are arranged such that an increase in the number of structures in such an arrangement leads to an exponential scaling in the number of possible challenges/responses to challenges.

The device may comprise a plurality of structures connected or connectable in parallel, the device comprising a number of such parallel-connected structures, connected together in series or parallel.

The plurality of structures may comprise N structures electrically connected or connectable together in series, and the device may be arranged to facilitate the selective measurement of the output of different series combinations of two to N of the N structures.

The plurality of structures may comprise N structures connected or connectable to N switches, the N structures being electrically connected or connectable to K structures connected or connectable to K switches, such that the number of possible measurements by selective operation of the switches is equal to $2^{N+K}$.

The plurality of structures may comprise N structures connected or connectable to N switches, arranged in parallel, such that the number of possible measurements by selective operation of the switches is equal to $2^N$.

The or a plurality of structures comprising N structures connected or connectable to N switches, arranged in parallel, may form a unit, and there may be M of these units in series, such that the number of possible measurements by selective operation of the switches is equal to $2^{N \times M}$.

Facilitating an electrical measurement may comprise facilitating an electrical measurement of an output spectrum of the at least two structures of the plurality in electrical combination, measuring how the electrical output differs with different electrical inputs.

The device may be arranged to perform the measurement, or the device may be connected or connectable to another device that is able to perform the measurement.

The device may be arranged to facilitate the physical altering of a structure, optionally after a challenge involving that structure, to change a response provided by that structure when subsequently challenged.

According to a second aspect of the invention, there is provided a system for generating a unique response to a challenge, the system comprising a first device for challenging a second device, the second device comprising: a plurality of structures, each structure exhibiting quantum mechanical confinement, and each structure being arranged to provide a unique response when challenged with an electrical measurement, the unique response being linked to the atomic makeup of the structure that defines the quantum mechanical confinement; the second device being arranged to facilitate a challenge of at least two structures of the plurality in electrical combination to generate the unique response, by facilitating an electrical measurement of an output of the at least two structures of the plurality in electrical combination; the first device being connected or connectable to the second device in order to perform the measurement, the unique response being derivable from the electrical measurement, According to a third aspect of the invention, there is provided a method of generating a unique response to a challenge, the method comprising: challenging at least two structures of a plurality of structures in electrical combination, by electrically measuring an output of the at least two structures of the plurality in electrical combination; the unique response being derivable from the electrical measurement; wherein each structure exhibits quantum mechanical confinement, and each structure provides a unique response when challenged with an electrical measurement, the unique response being linked to the atomic makeup of the structure that defines the quantum mechanical confinement.

For the avoidance of any doubt, one or more features described in relation to any one aspect of the present invention may be used in combination with or in place of any one or more features of another aspect of the present invention, unless such replacement or combination would be understood by the skilled person from a reading of this disclosure to be mutually exclusive. For example, and more particularly, any feature described in relation to an apparatus aspect of the present invention may be readily used in place of or in combination with any feature described in relation to a system of method aspect of the present invention.

For a better understanding of the invention, and to show how embodiments of the same may be carried into effect, reference will now be made, by way of example, to the accompanying diagrammatic Figures in which:

BRIEF DESCRIPTION OF THE DRAWINGS

FIG. 9 schematically depicts how a number of structures may be electronically connectable in parallel to form a device for generating unique responses;

FIG. 10 schematically depicts the device of FIG. 9 in the form of a single unit;

FIG. 11 schematically depicts the use of multiple units of FIG. 10 in series;

FIG. 12 schematically depicts operating principles associated with devices of example embodiments;

Figure 1:
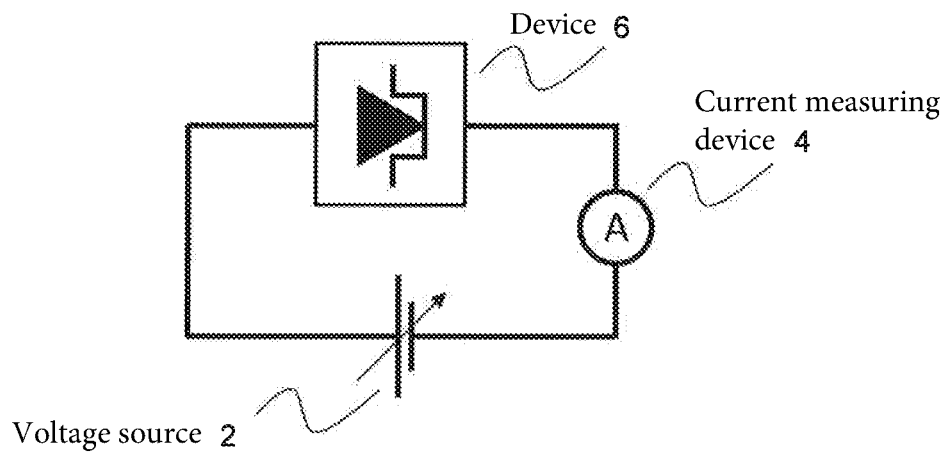
FIG. 1 schematically depicts a device for generating a unique response to a challenge, according to an example embodiment.

As mentioned above, many of the problems with existing methods for generating a unique response to a challenge (e.g. determining or generating a unique identifier) is that the methods are based on macroscopic physical effects. According to example embodiments of the present invention, it has been realised that at least some of the problems of the prior art may be overcome by a device that facilitates the generating of a unique response using structures that exhibit quantum mechanical confinement.

More particularly, the device facilitates the challenging of two such structures in electrical combination (e.g. in series or parallel), with the electrical output of such a combination being used to provide the unique response. Highly surprisingly, it has been found that the combined output of such structures is not the same as the addition of the outputs of each structure in isolation, as would be expected with classical physics or electronics. This is to the extent that even with knowledge of the outputs of each structure in isolation, it is not possible to predict the unique output, and therefore response, of the structures in electrical combination. This is an extremely important feature, since it allows for the general improvement of the generation of uniqueness responses, in terms of the strength, uniqueness or number of such responses, and/or a strength of the device as a whole, in terms of resistance to characterisation in an attempt to circumvent security or the like that the device might otherwise provide.

The quantum mechanical nature of the implementation typically allows the device or its structures to be small, and be low power. Device fabrication might also be generally cheaper than devices used in macroscopic methods. Perhaps most importantly, however, is that the quantum mechanical nature of the structures allows for the response (e.g. identifier) to be particularly unique, repeatable, and consistent. This is particularly the case when the quantum mechanical effect that is measured is a spectrum or spectra (e.g. a combination or convolution of more than one spectrum, or measurements or more than one distinct spectrum). For instance, a device or structure exhibiting quantum mechanical confinement, particularly in two or more dimensions, may provide a unique measurable spectrum of specific confinement energy levels of electrons or holes in the structure of the device (or part thereof) that exhibits the confinement. Typically this part of the structure may be a nano-structure (or similar) in the form of a well, wire, layer, ring, dot, or other structure, that has spatial dimensions at or below length scales corresponding to the de Broglie wavelength of electrons in the system. The physical properties of such a nano-structure (or similar), including its atomic arrangement, size and composition, and the exact form of fields (e.g. strain, magnetic and electric) through the structure may all have an influence on the energies at which charge carriers are confined, according to solutions of the Schrodinger equation for the system. As will be appreciated, it is practically impossible to fabricate two structures that share all of these properties (and possibly more), so no two structures will be exactly the same. Therefore, the nature of confinement will not be the same, and therefore no two measurable quantum mechanical effects as a result of that confinement will be the same. So, the measurable quantum mechanical effect for such a structure can be used to provide a unique response (e.g. as a unique identifier) for that device or a structure thereof. In other words, it has been realised that the confining structure (or, in general, confinement) provides an efficient and effective physically (sometimes referred to as physical) unclonable function (PUF). The combination of electrical outputs of more than one structure exhibiting quantum mechanical confinement adds to these benefits, as described above.

The use of a measurable electrical quantum mechanical effect, or electrically measuring a unique quantum mechanical effect (which might be defined as the same functionality from different perspectives) may be advantageous over, for example, optical properties and/or measurement. The use of an electrical based approach allows for simple, quick and effective determining and/or generating of the unique response, for example on a chip, or within or as part of an electric circuit or device. In contrast, optical techniques might require more complex equipment, or more numerous components, or external components, which could add to cost, complexity, weight, and so on.

Principles underlying the invention, and example implementations of the invention, will now be described, by way of example only, with reference to the Figures. The Figures have not been drawn to any particular scale, and are simply provided as diagrammatic aids for understanding the principles underlying the invention, and/or its application.

FIG. 1 schematically depicts a device for generating unique responses to challenges. The device comprises a variable voltage source 2 and a current measuring device 4. Connected in series with the voltage source 2 and current measuring device 4 is a part of the device 6 that exhibits quantum mechanical confinement. This particular part of the device 6 is shown in generic form, and is indicated as comprising one or more resonant tunnelling diodes, which might be a convenient form of device for use in embodiments of the present invention. Such diodes are readily available, and provide electrical output spectra which are easy to characterise in terms of peaks in those spectra, which may be useful for determining unique responses.

The part of the device 6 may be controlled to determine which diodes, or which combination of diodes, within the part of the device 6 are challenged, for instance by provision of power from the voltage source 2, with the resulting output being measured by the current measuring device 4.

Figure 2:
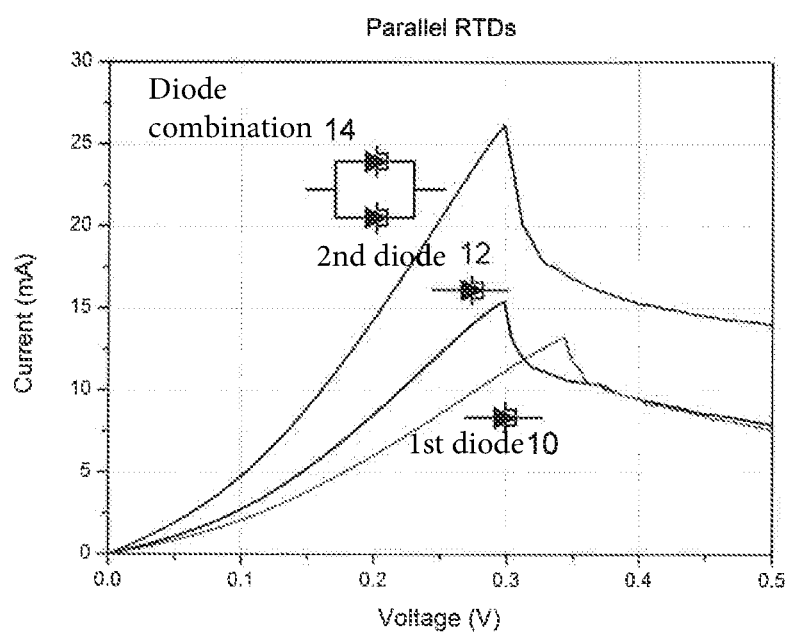
FIG. 2 is a graph schematically depicting different unique responses to challenges of different structures or combination of structures, of the device of FIG. 1, according to an example embodiment.

FIG. 2 is a graph schematically depicting responses to challenges of the part of the device exhibiting quantum mechanical confinement already described in relation to FIG. 1. FIG. 2 shows that if a first diode 10 is challenged, a unique voltage-current spectrum results. This is a unique response. If a different diode 12 is challenged, a different unique spectrum and thus response, is obtained. Therefore, this already shows that different unique responses can be obtained from the device, simply by challenging different structures within the device that exhibit quantum mechanical confinement. However, and as already discussed briefly above, a surprising result is obtained when two structures exhibiting quantum mechanical confinement are challenged in electrical combination, with a resulting combined output measured to obtain a unique response.

FIG. 2 shows such a unique response to a challenge of two structures exhibiting quantum mechanical confinement, in combination 14. In this case, the structures that are challenged in combination are the two diodes that were previously described as being challenged in isolation 10, 12. The diodes are connected in parallel. The unexpected and therefore surprising result of challenging the structures in combination is that the resulting response 14 is not simply a combination of the individual responses of each structure that would be obtained if the structures were challenged in isolation 10, 12. Referring to FIG. 2, this means that the spectrum obtained by challenging the diodes in combination 14 is not simply in addition of the spectra obtained from challenging the diodes in isolation 10, 12.

This result is extremely important for a number of reasons. Firstly, even if it were possible to have a hacker of the device characterise each structure in isolation, it would not be possible from this characterisation to predict the result of challenging each structure of the device in combination. This means that the device as a whole is stronger, at least because it would take longer to characterise the device for any attempt at hacking or similar. Not only would every structure need to be challenged, from which a response is determined, but every combination of devices would need to be challenged.

In a related manner, the fact that the responses to challenges of combined structures is not simply an addition of responses to individual challenges of individual structures, means that the number of possible challenges and responses to the device as a whole increases, and, depending on the layout and arrangement of the structures, can increase exponentially with an increase in the number of structures This very rapidly means that the device may be extremely secure. For instance, as will be discussed in more detail below, it might be relatively easy to construct a device with a number of elements that is readily achievable using today's technology, yet which would take an impractical or even an impossible amount of time to fully characterise to overcome the security it provides.

Although in FIG. 2 only a single peak is visible in the output spectrum of the combined challenge 14, there are in fact two peaks that are located extremely close together. These are not visible in the graph. Generally, it has been found that structures connected in parallel 14 as shown in FIG. 2 tend to add their currents together, and any one or more peaks that might have appeared in the spectrum of the respected structure's output in isolation also appear to generally be present in the combined unique response/spectrum, but in a smaller voltage region.

Figure 3:
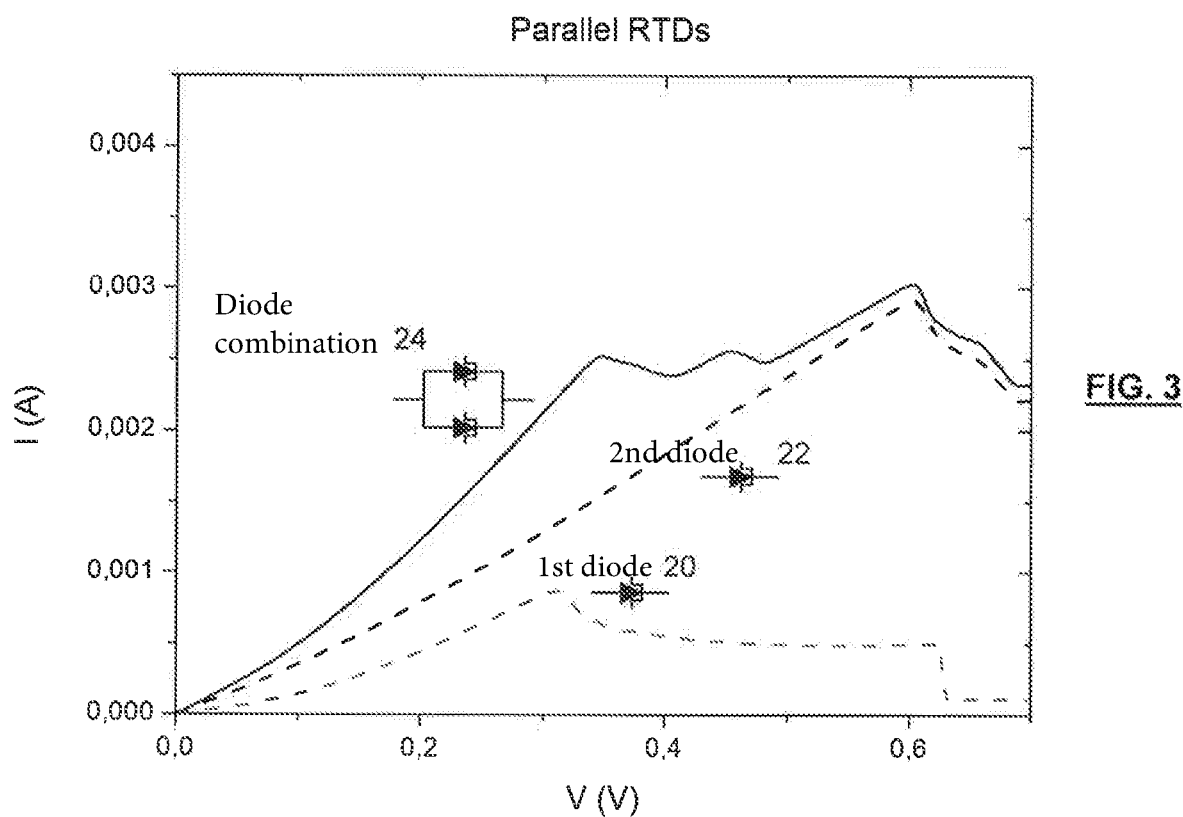
FIG. 3 is a graph schematically depicting different unique responses to challenges of different structures, or combination of structures, according to another example embodiment.

FIG. 3 is a graph showing unique responses of two different diodes measured in isolation, in terms of their respected voltage-current spectrum 20, 22. Also shown in that graph is the unique response obtained by challenging the two diodes in combination, in this case in parallel 24. As discussed above, it can be seen that, again, the unique response obtained by challenging the structures in combination 24 is by no means simply an addition of the output response spectra of the structures when challenged in isolation 20, 22. It is also worth noting that, as alluded to above, the unique response of the combined output 24 exhibits two peaks which are located in a narrower voltage region than the region defining or separating the peaks of the spectra when challenged in isolation 20, 22. Also, and importantly, the spectra of the structures when challenged in isolation 24, is also more feature-rich than any of the spectra of the structures when challenged in isolation 20, 22, making the combined response spectra 24 even more unique and less predictable.

Figure 4:
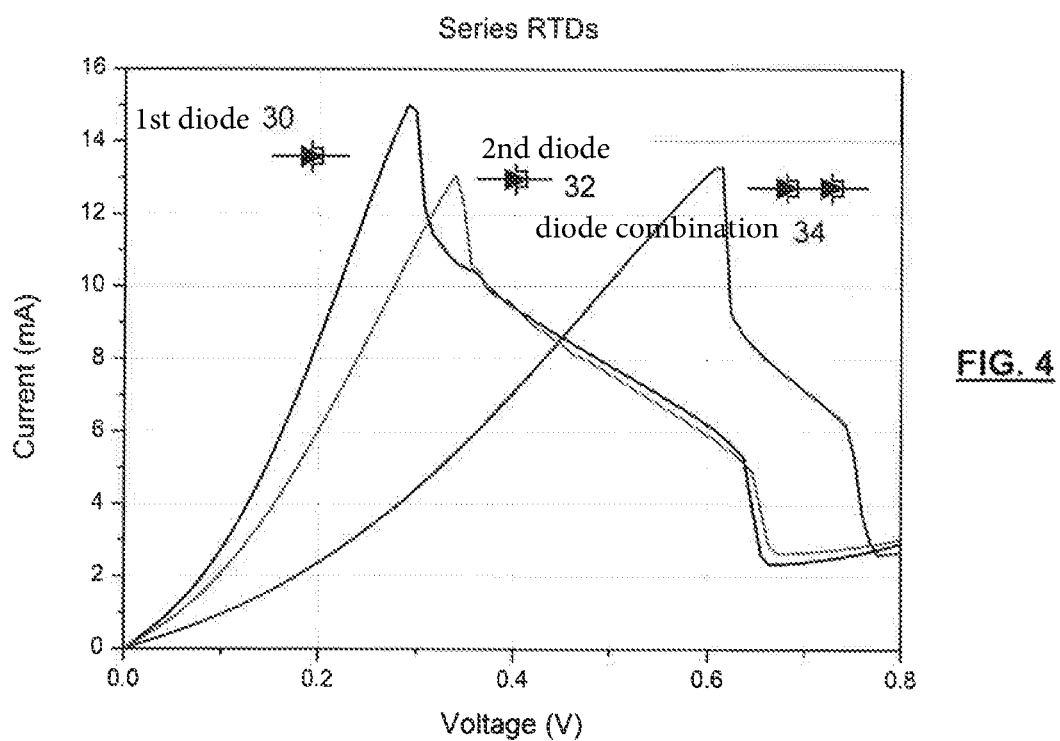
FIG. 4 is a graph schematically depicting different unique responses to challenges of different structures, or combination of structures, according to another example embodiment.

Of course, structures do not need to be combined in a parallel electrical configuration. Structures could be additionally or alternatively combined in series. The graph of FIG. 4 shows the electrical output voltage-current response spectrum for a first resonant tunnelling diode 30. A second diode is separately challenged, and a response spectrum for a second resonant tunnelling diode 32 is also shown in the graph. The graph also includes a response output spectrum for the same two diodes when electrically challenged in series combination 34. As with the parallel examples of FIG. 2 and FIG. 3, FIG. 4 shows that again, when the structures are challenged in electrical combination (in this case, in series combination) the resulting spectrum 34 is not a simple addition of the output response spectra for resonant tunnelling diodes 30, 32 of the structures when challenged in isolation. This makes the output response spectrum of the structures when challenged in combination 34 to be impossible to predict, even with knowledge of the response spectra of the diodes if and when challenged in isolation.

As a general rule, it has so far been determined that structures connected in a series share the voltage drop across both of such structures, and any peaks that might have been present in their response spectra when measured in isolation are, when measured in combination, shifted to higher voltages. FIG. 4 clearly shows this. Indeed, FIG. 4 only shows part of the combined output spectrum 34, where only a single peak is visible. Another peak is also present in that spectrum, but is not visible in that graph due to the scaling used in that graph.

It has already been described how it is both surprising, unexpected, and yet important, that the responses of structures when electrically combined is not predictable, and is different from the simple combination by addition of individual output responses of structures when challenged in isolation. Therefore, being able to readily and easily electrically combine numerous structures of a plurality of structures, in order to measure the electrical output of such a combination, is highly desirable. FIGS. 5 to 11 show different ways of achieving different combinations of structures.

Figure 5:
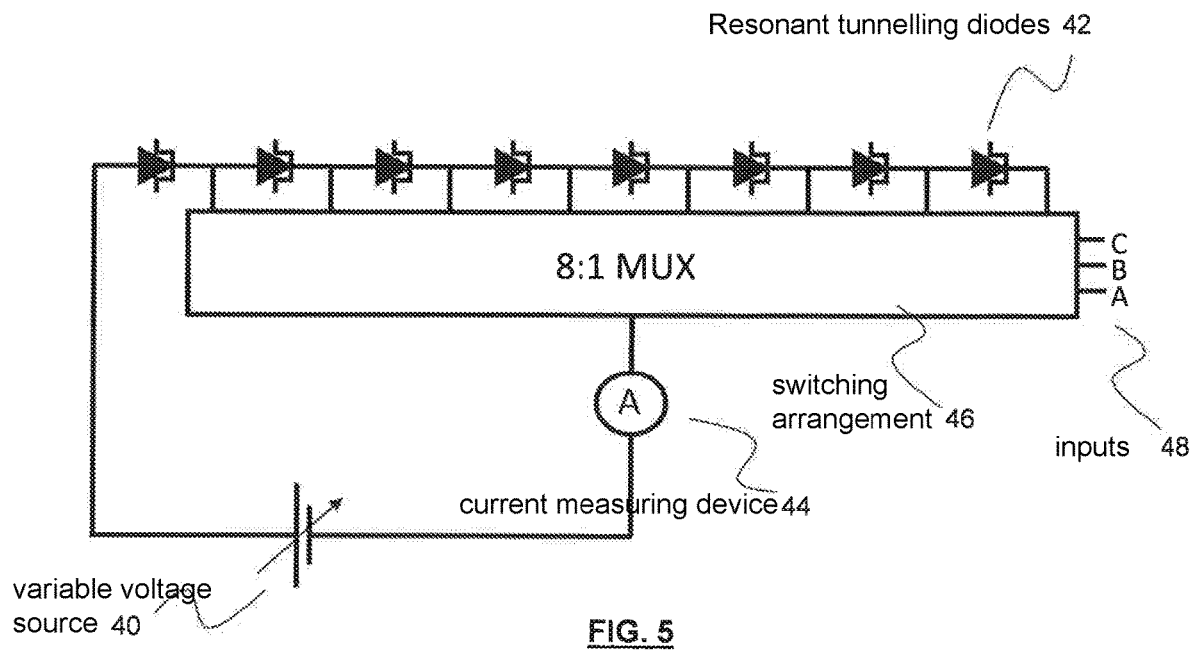
FIG. 5 schematically depicts a device for generating unique responses according to another example embodiment.

FIG. 5 schematically depicts a device according to another example embodiment. The device comprises a variable voltage source 40 for powering a plurality of N diodes 42 in the form of total resonant tunnelling diodes. A current measuring device 44 is provided to measure the combined output of different series combinations of 2 to N diodes 42. A switching arrangement 46, in this case a multiplexer, is used to selectively connect together in a series a desired combination or number of the N diodes 42. The switching arrangement 46 may be made to achieve these electrical combinations by appropriate input 48, for example from a controller or the like (not shown).

By appropriate control of the switching arrangement 46, different numbers of the N diodes 42 are electrically connectable in series. Each different combination can be challenged, and a unique response from the combination can be obtained, in the manner described above.

Figure 6:
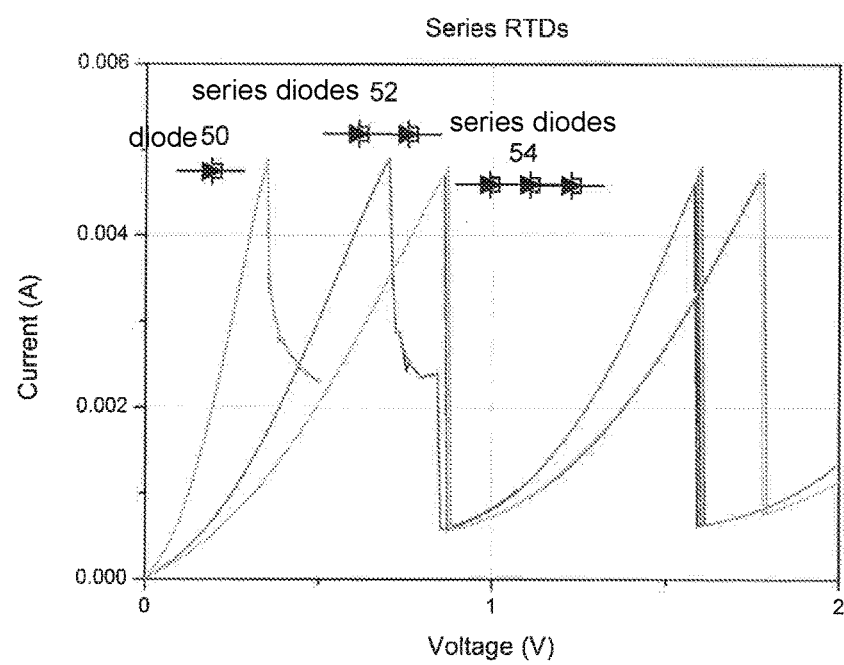
FIG. 6 is a graph schematically depicting different unique responses to challenges, obtainable using the device of FIG. 5.

FIG. 6 is a graph schematically depicting different output spectra in the form of different unique voltage-current characteristics for different series combination of diodes. While only parts of the spectra are shown, and while the exact detail of the spectra are not particular important for an understanding of the embodiment, it is sufficient to say that the spectrum for each different combination of diodes is unique. For example, it can be seen that the spectrum or part thereof, for one diode in isolation 50 is quite different from the unique output response spectrum for when another diode is added in series 52, and when yet another diode is added in series 54. Therefore, as can be understood from FIGS. 5 and 6, a large number of different unique responses can be obtained quickly and effectively.

The number of challenge-response pairs that is available using the device shown in and described in reference to FIGS. 5 and 6 increases, generally, linearly with an increase in number of the structures used in the series arrangement. This may be acceptable in certain circumstances, for example if the number of devices connected or connectable in series provides a desired number of challenge-response pairs for the application in question. However, with such a linear relationship, it may be easier to characterise the entire device, for example challenging and measuring a response of each possible series combination of structures. This might leave the device open to exploitation, for example circumventing any security or the like that it provides at the time, or at some subsequent point in time.

In order to provide a much stronger and potentially more useful device (e.g., a physically unclonable function), it may be desirable that the device comprises structures that are in an arrangement whereby an increase in the number of such structures in that arrangement leads to an exponential-like increase in the number of available challenge-response pairs. This makes it increasingly difficult, and if not impossible depending on the number of structures in the arrangement, to characterise the device as a whole, and to circumvent any security measure or similar that the device provides. In other words, the exponential nature of the number of challenge-response pairs that are available might mean that it is practically impossible for all of the challenge-response pairs to be used or characterised.

The very fact that the combined output result of structures when electrically combined is not the same as the simple addition of individual responses of each structure when taken in isolation, nor predictable from such responses in isolation, allows this exponential relationship to be realised, especially when the structures are connected or connectable in a parallel relationship.

FIGS. 7 to 11 are now used to describe how exponential-like relationships can be obtained and taken advantage of.

Figure 7:
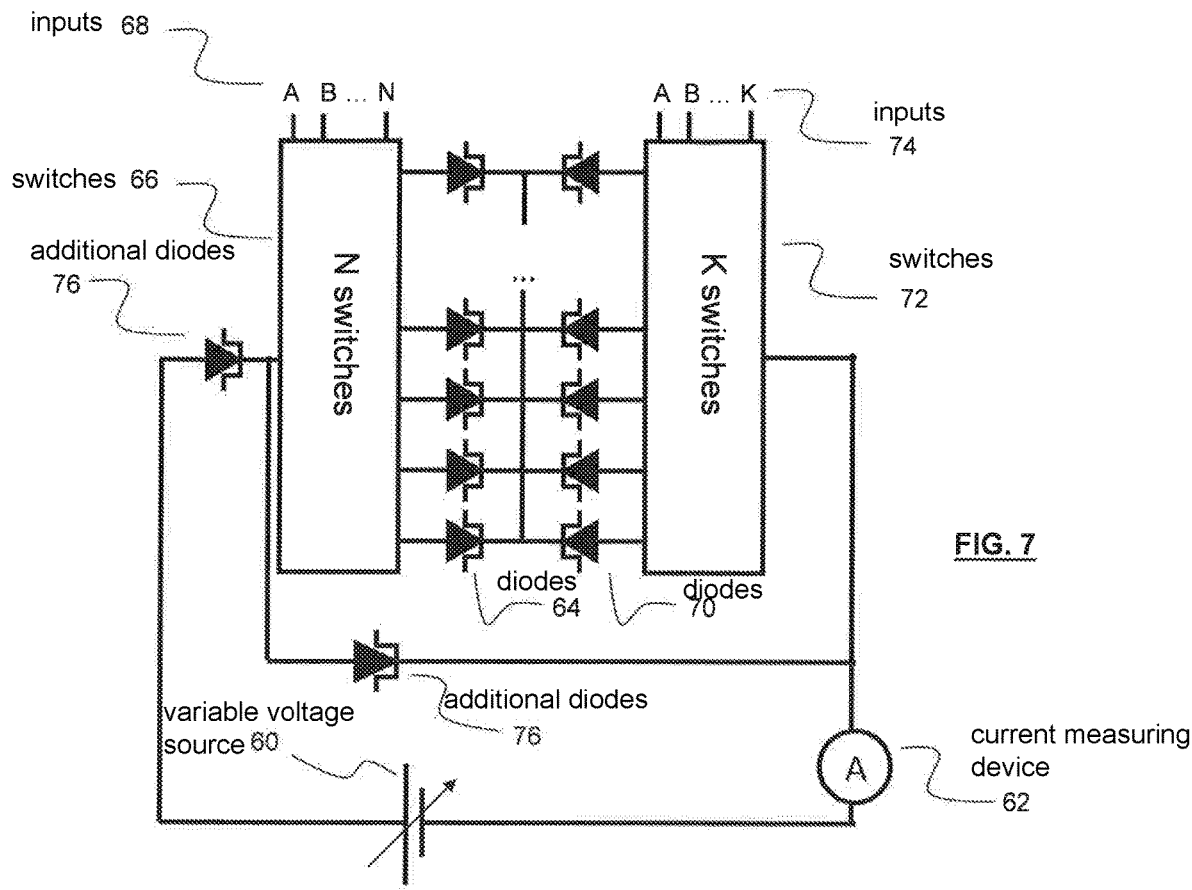
FIG. 7 schematically depicts a device for generating unique responses according to another example embodiment.

FIG. 7 schematically depicts a device according to an example embodiment. A variable voltage source 60 is provided, as well as a current measuring device 62, largely as already described above. In this embodiment, N resonant tunnelling diodes 64 are connected to N respective switches 66, the N switches being controllable by appropriate inputs 68 via a controller or similar (not shown). Connected or connectable to those N resonant tuennelling diodes 64 are K resonant tunnelling diodes 70, each of which K resonant tunnelling diodes 70 is connected to a respective switch of K switches 72, which switches are controllable by respective inputs 74, again by a controller or similar (now shown).

The device might optionally comprise additional diodes 76 for either current limiting purposes or to provide a non-zero response if, for whatever reason, there is no need to use the array or arrangement of N resonant tunnelling diodes 64 and/or K resonant tunnelling diodes 70.

With the arrangement shown in FIG. 7, the number of possible measurements by selective operation of the switches 66, 72, or in other words the number of possible or available challenge-response pairs, is equal to $2^{N+K}$. So, the desired exponential relationship is obtained. It will already be appreciated that only a relatively small number of diodes/switches are required in order to achieve a very large number of possible challenge-response pairs.

Figure 8:
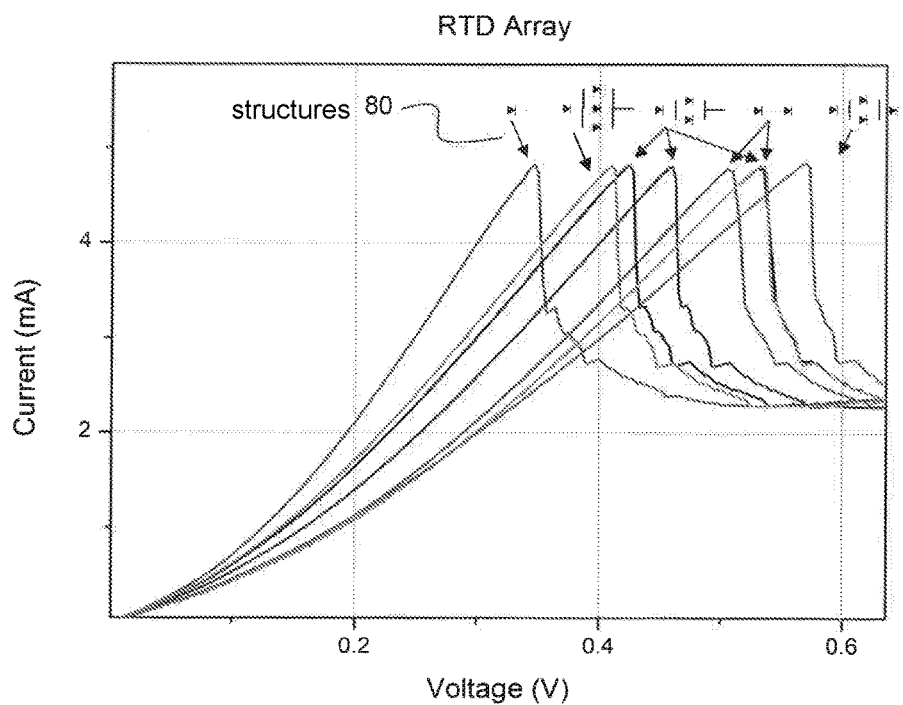
FIG. 8 is a graph schematically depicting different unique responses to challenges, obtainable using the device of FIG. 7.

FIG. 8 is a graph depicting some of the numerous different unique response spectra that may be obtained by appropriate control of the switches shown in and described in reference to FIG. 7. Again, the exact nature and characteristic of the spectra are not particularly important for understanding this embodiment, other than to show that the operation of the switches can be used to ensure that there is a very large number of different combinations of structures 80 that lead to a very large number of respective unique responses to challenges of those combined structures.

The exponential nature of the challenge-response pair relationship can be further increased by connecting a number of structures in parallel to form a unit, and then connecting a number of such units in series or parallel. For instance, FIG. 9 shows how N resonant tunneling diodes 90 may each be connected to one of N respective switches 92 (e.g. in a multiplexer or similar), which are controllable by N inputs 94. An optional diode 96 might be provided to provide a non-zero response, for example a single challenge-response pair, if there is no need or desire to use the switch arrangements 92 and respective diodes 90. In many ways, FIG. 9 represents a portion of FIG. 7. The number of possible structure combinations in the example of FIG. 9 is $2^N$. Even in isolation, a large number of challenge-response pairs can be easily obtained. However, this number can be easily increased, as will now be described.

FIG. 10 shows that the device of FIG. 9 might be referred to or defined as a unit 100. This might be for explanatory purposes, and/or constructional purposes. That is, 'unit' might simply be an easy way of explaining the structure, and/or the structure can be made in such unit form for easy replication. FIG. 11 shows how a number of these units could be connected in a series 110, along with a variable power supply 112 and a current measuring device 114. A current limiting diode 116 might also be provided, for the reasons described above. Another type of diode providing a non-zero response may be substituted for current limiting diode 116 in further implementations. If the number of units in the series relationship 110 is taken to be M, then the number of possible measurements by selective operation of the switches forming the units 110 is equal to $2^{N \times M}$. With such a relationship or similar, a potentially huge number of possible challenge-response pairs could be obtained with a relatively small number of structures.

FIG. 12 shows how a very large number of potential challenge-response pairs means that it will be extremely difficult to fully characterise a device with such structures in any reasonable timeframe. In practical terms, this means that there will always be available challenge-response pairs that have never been compromised. For instance, FIG. 12 shows that a transient response time of each structure (often referred to as an intrinsic RC time) 120, e.g. a diode, might be of the order of ~1 ps. It would take approximately this amount of time to electrically charge the diode or a combination of diodes, and measure the response therefrom—i.e. to characterise that structure or such structures in combination. This is obviously an extremely short period of time. However, the number of structures required in a device may only be relatively small for there to be an extremely large number of possible challenge-response pairs that need to be characterised, if the arrangement of structures is such that an exponential relationship is obtained. Using the device example of FIG. 7, using N=K=40—a relatively small number of structures—the number of available challenge-response pairs 122 is $2^{N+K}=2^{80}=\sim 1.2 \times 10^{24}$. The product of the RC time 120 and number of available challenge-response pairs 122 defines the minimum time to fully characterise the device 124. In this case, the time period is approximately 38,000 years.

The simple illustration in FIG. 12 shows that even with a relatively small number of structures exhibiting quantum mechanical confinement, and a relatively simple switching regime and structural layout, a vast number of challenge-response pairs are available, which yields a practically impossible time frame for fully characterising and thus comprising the device as a whole. Thus, an extremely useful and practical device is realised for generating unique responses.

Figure 13:
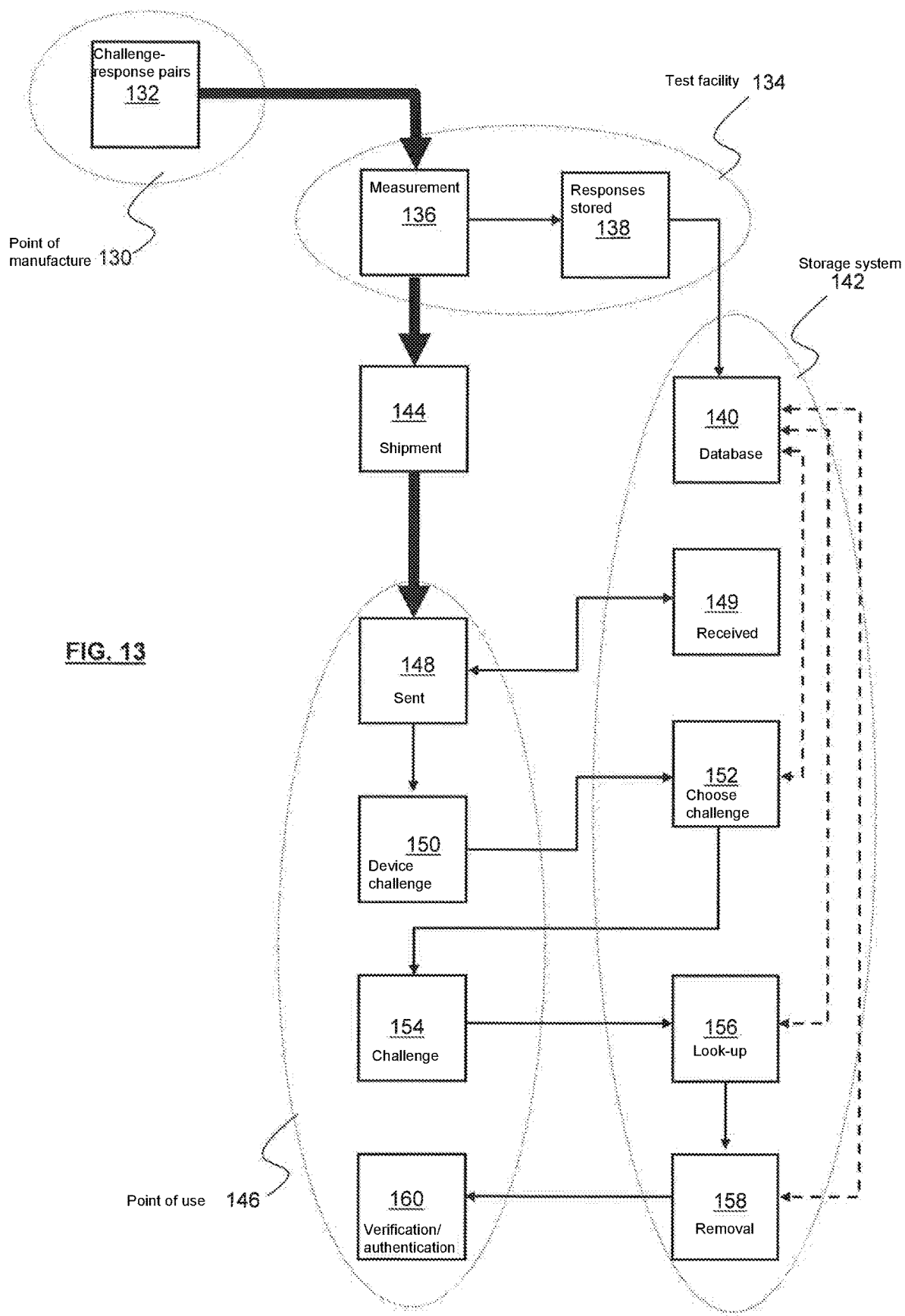
FIG. 13 schematically depicts methodology associate with use of a device according to example embodiments.

A practical example of the devices and methodologies described above is now summarised in FIG. 13. In a practical example involving manufacture and use of a device, there may be a need to keep in mind that different parts of the manufacturing process, or a shipping process or a storing process, may be unsecure, and open to the device being at least partially compromised. Thus, there may be a need to verify that the device is a genuine device, or that perhaps it has not been comprised to some extent. In FIG. 13, the thicker arrows depict physical movement of the device, whereas the thinner or narrower arrows depict transfer of information or similar.

At a point of manufacture 130, a device comprises an arrangement or array of structures exhibiting quantum mechanical confinement, as described above, and the device has N possible challenge-response pairs 132. It is possible that the point of manufacture 130 may be an unsecure environment. At any point where the device is not in a secure environment, the security of the device, or provided by the device, might be compromised.

The device is then physically transferred to a secure test facility 134. At the secure test facility 134, a subset of N challenge-response pairs may be obtained by appropriate measurement 136. M is far less than N, for example by one or more orders of magnitude. The N responses may be stored 138 in a secure database 140, located in a secure server or cloud based-system or similar 142.

Next, the device is shipped 144 to an end point of use 146, the shipping environment possibly providing another unsecure environment.

At the end of point of use 146, a verification request may be sent 148 to the secure server 142 by the device, or received 149 by the device from the secure server 142.

At the end point of use, in response to the verification request 148, 149, a device challenge 150 is requested. The secure server 142 responds by choosing 152 a pre-stored challenge from the database 140. This challenge is then used at the end point of use 146 to challenge 154 the device. The challenge 154 results in the response to that challenge being transmitted back to the server 142, where the response is verified by ensuring that the response that is received matches the challenge that was sent, via a look-up 156 of the secure database 140.

The challenge-response pair that has been used to verify or authenticate the device may then be removed 158 from the database 140. This might be to ensure that a fresh verification may be used at some subsequent time, if necessary. This might be to reduce the chances of the device being compromised, for example by the authentication being in someway hacked or otherwise intercepted in an attempt to re-use the same challenge-response pair used or previously used to verify or authenticate the device. Indeed, for similar reasons, the challenge-response pair may be removed from the database even if the verification is not successful.

Finally, it will be known at the end point of use 146 whether the device is verified or authenticated or not 160.

The verification or authentication could be solely for verifying or authenticating that the device is a genuine device, for example not a counterfeit device. However, the verification or authentication could be part of a step of allowing the device to increase or improve its functionality or similar, as a result of such verification or authentication. That is, if the device is verified, the increase in functionality is allowed to take place. The verification or authentication using a challenge-response could be separate to the use of a different challenge-response, the different challenge-response being used to increase or improve functionality.

It will therefore be appreciated that important to the authentication, or verification, at least in some embodiments, is that the method comprises storing (e.g. remotely or locally) at least one unique response from a structure of the device, or a unique response from a plurality of devices in combination, for use in subsequent verification or authentication of the device.

The unique response of a structure exhibiting quantum mechanical confinement to an electrical input is determined by the atomic structure of the structure or part thereof that defines that confinement. The structure itself (i.e. its atomic structure) can for example be deliberately altered in order to deliberately alter the response that is obtained from electrically challenging the structure. This can be achieved by heat or electrical biasing, above certain levels specific to the device in question. The electrical biasing might provide that heat, or a dedicated heater could be provided for each structure, a plurality of structures, or for all structures. For instance, the structure might be physically altered after a particular challenge, in order to reset the structure for subsequent use and to obtain a new challenge-response pair. The structure might be altered to the extent that the structural device is damaged or destroyed, or at least damaged or destroyed to the extent that a unique response is no longer derivable from challenging such a structure of that device. Altering the structure to generate a new unique response or challenge-response pair might add even further to the number of challenge-response pairs available from any given arrangement of structures, thus increasing the number of challenge-response pairs available to a user which has many benefits as already described above. Damaging or destroying a structure, after a challenge of that structure, might be useful in preventing that challenge-response pair being available again in future, which might otherwise be used to compromise the device, or security or otherwise which is provided by the device.

Previously, a response has been described as being "unique" in that this might mean that it is statistically improbable that the unique identifier or response might be stumbled across randomly, at least in a practical timeframe relative to use of the system in question. This might be true on many levels. For instance, even without attempting to challenge the device, it is statistically almost impossible to know what response will be obtained in advance of any challenge. However, even if it is possible to challenge the structures in any device, it is also then very difficult, if not almost impossible if the number of challenge-response pairs are sufficient, to characterise the device, and know all possible unique challenge-response pairs. This is because it of course takes a certain amount of time to characterise the device, and that time might be impossibly or impractically large. Viewed the other way around, even if all challenge-response pairs were characterised, there might be so many challenge-response pairs that it would be almost impossible to determine which one or more of such pairs were of use or interest, for example in authenticating or verifying the device, especially in a practical timeframe.

Figure 14:
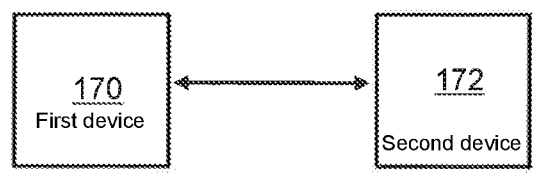
FIG. 14 schematically depicts a system according to an example embodiment, comprising first and second devices.

In the above examples, the device comprising the structures exhibiting quantum mechanical confinement has also been described as the very same device that undertakes the measurement of output from those structures. However, FIG. 14 shows that this is not necessarily the case in all embodiments. In another example, as shown in FIG. 14, there may be a more system-like approach to the embodiment of the invention. The system might comprise a first device 170 for challenging a second device 172. The second device 172 might comprise the structures exhibiting quantum mechanical confinement, as discussed above. The second device might simply facilitate the challenge of those structures, and may not necessarily challenge those structures directly, or at all. That is, the second device 172 might comprise one or more electrical communicators, connections, connectors, or switches that allow connection or similar of a first device 170, that first device 170 being the device that actually challenges the structures of the second device 172. For instance, the first device 172 might be provided with a power source or measurement of electronics or similar.

Of course, various combinations of the system of FIG. 14 are possible. For example, the first device 170 might have more or fewer components, and the second device 172 comprise more or fewer components. The second device 172 might comprise numerous switches and the like for electrically combining different structures, as well as the structures exhibiting quantum mechanical confinement, and the first device might provide the power supply and measurement electronics. Alternatively, the first device might also provide the switches necessary for connecting the structures providing in the second device 172 in whatever way is necessary to generate a desired number or structures and the challenge-response pairs. The first device might be used to store a sample or subset of challenge-response pairs available from the second device, in a manner at least similar to the methodology described in relation to FIG. 13. The first device might implement the altering of the structures, to change the unique response that those structures provide when challenged.

In general, one or more devices of a system, or a device if used in isolation, will require some sort of power supply (e.g. variable) and some sort of measurement electronics, in addition to the structure or structures that exhibit quantum mechanical confinement. Of course, additional features and/or functionality might be provided by such a device or system.

The device, or part thereof, or system part that challenges the structure or structures may have other functionality. The challenging may only be a small part of the device capability, being used for security or verification purposes or similar. The device may be, or be in connection with, a communications device or similar, the nature or allowance of communications being dependent on the result of the challenging. In another example, the device may be, or be in connection with a piece of equipment, the level of functionality of that equipment being dependent on the challenge. For example, if the challenge is successful, the equipment may be permitted to operate with a higher degree of functionality. The equipment may be anything where it is desired to securely restrict or control the levels of functionality, which might include performance. For example, the challenge-response described above may be used in the control of performance of a processor, performance of a car engine, access levels in terms of functionality or security in a networked environment, in terms of data access or hardware control. These are simply described examples to illustrate the breadth of applications where the challenge-response methodology and apparatus described above can be used.

Figure 15:
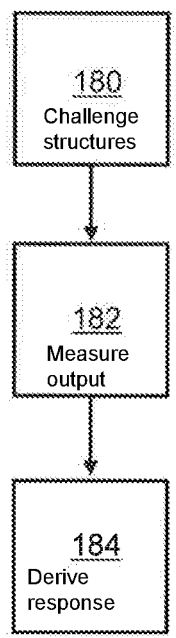
FIG. 15 schematically depicts a general methodology according to example embodiment.

FIG. 15 is a flowchart depicting in more general form the methodology described above. The method comprises generating a unique response to a challenge. In more detail, the method comprises challenging at least two structures of a plurality of structures in electrical combination 180. This is achieved by electrically measuring an output of the at least two structures of the plurality electrical combination 182. The unique response is derivable from the electrical measurement 184.

It has already been described above how the system can be used to generate a large number of unpredictable responses. It has also been described above how such responses can be used in the verification or authentication of the device. However, the large number of unpredictable unique responses might also find another use—nondeterministic (sometimes referred to as random) response generation. Without knowing what response will be provided by each structure, each structure can be used to provide a nondeterministic response, which might be used to derive, or be, a random number or similar. For example, the location or peak will be random, or the height or width of that peak might be random, or the time to sweep an input to achieve the peak output might be random. Of course, without changing the structure as discussed above (e.g. by use of heat or electrical biasing), the response each time will be the same. So, to obtain a different nondeterministic response, another structure needs to be available to be provide such a different nondeterministic response, or a different combination of structures. With the vast numbers of structures and combinations that are readily achievable, as discussed above, a vast source of different nondeterministic responses is also readily achievable. The number of different nondeterministic responses might, as described above, be so vast as to never be exhausted or, put another way, be open to characterisation such that all possible different nondeterministic responses are in some way compromised. So, the device described above, even when structures are not challenged in isolation (e.g. when challenged in isolation), may serve as a useful random/nondeterministic response generator. Similarly, the methods described herein, even when structures are not challenged in isolation (e.g. when challenged in isolation), may serve as a useful random/nondeterministic response generation method.

The unique response is derivable from the electrical measurement in that the measurement might actually be the unique response. Alternatively, one or more features of the measurement may be used to provide the unique response. The unique response measured from the electrical output of the structures in combination might be the presence or location of one or more peak, as described above. However, this is only an example, and in other examples the derivation of the unique response from the measured output might be a peak or a trough, or another particular feature or shape of the characteristic of a spectrum or other response to electrical input.

It has already been described above how the unique response derivable from the structure exhibiting quantum mechanical confinement is, in some embodiments, a voltage-current spectrum, or derivable from such a spectrum. Of course, different spectra may be used, depending upon the way in which the structures are electrically challenged or the output therefrom measured, for example voltage, current, capacitance, resistance, memristance, or integrals or derivatives thereof. In some instances, a spectrum might not actually be necessary, and a device will be challenged to a particular value or level.

The device that exhibits quantum mechanical confinement has, in general, been described in the embodiments as a diode, and typically a resonant tunneling diode. However, other structures, and related forms or degrees of confinement are of course possible. For example, the structure that exhibits quantum mechanical confinement may define confinement in at least one dimension, in at least two dimensions, or in at least three dimensions. Greater confinement might result in more refined or sharper features in a resulting output, for example peaks or troughs in a spectrum. The structure that exhibits quantum mechanical confinement may comprise, be and/or provide one or more of: one or more tunneling barriers; a resonant tunneling diode; a Schottky barrier; a graphene nanoribbon; quantum mechanical confinement in a well; quantum mechanical confinement in a wire; quantum mechanical confinement in a layer; quantum mechanical confinement in a ring; quantum mechanical confinement in a dot.

The unique response described above might alternatively or additionally be defined or described as a unique identifier, a key, or a fingerprint, and so on. This is to the extent that the terms might be used interchangeably.

It has already been described, or at least alluded to, above that the device can easily be arranged such that a transient response time for a challenge-response, and a number of available challenge-response pairs, which defines the minimum time to fully characterise the device, is large, to the extent that it would take an impractical or even an impossible amount of time to fully characterise the device and to therefore overcome security it provides (e.g. in that time). This security could be for the lifetime of the device, for example in terms of a period from fabrication of the device, to a point in time when the device is no longer required, or is no longer useable. The time could be for an application of the device, in terms a period or periods during which the device is used and/or challenged. The time could be a time during which the device is in an unsecure environment, for example including one or more of being outside of a manufacturing facility; outside of a secure testing facility; outside of a manufacturer, tester, customer or user environment or facility; outside of a manufacturer's, tester's, customer's or user's control. So, an unsecure environment might be a storage location, or a shipping location or period, or a handling period in-between secure environments. Of course, it will be appreciated that this is all something of a functional definition, yet it would be readily understandable to someone with ordinary skill in this field. For example, if a period in an unsecure environment is understood or expected to be X days, months or years, then the device can be constructed such that the period required to fully characterise the device is greater than X days, months or years, and quite easily one or two orders of magnitude greater than X. Additionally, or alternatively, and perhaps more generally, if a lifetime of the device is understood or expected to be X days, months or years, then the device can be constructed such that the period required to fully characterise the device is greater than X days, months or years, and quite easily one or two orders of magnitude greater than X. Therefore, the period required to fully characterise the device could, with ease, be made to be more than 1 year, more than 5 years, more than 10 years, more than 100 years, more than 1000 years, more than 10,000 years, more than 100,000 years, more than 1,000,000 years, and so on.

The number of structures required to achieve the period just described will, of course, depend on that period, and how the structures are challenged (e.g. in isolation or combination, as described above). The number of structures could be greater than 5, greater than 10, greater than 25, greater than 50, greater than 100, and so on.

Of course, the time or period just discussed is, or can be, tied to the possibility to reset the device. For example, after a structure has been challenged in order to derive a nondeterministic response, the device could be arranged to facilitate ensuring that the structure is not or cannot be challenged until physical altering of the structure has taken place, to change a response provided by that structure when subsequently challenged. This could be implemented by some sort of register or similar, which ensures that a structure cannot be challenged again, until the register shows that the structure has been reset by having its structure changed. The structural change could be implemented after each structure is challenged, or after all structures are challenged, and could be implemented in code or similar, or as part of the hardware of the device. So, the time or period just discussed could a time or period before a reset takes place, or is set to take place. However, including the ability to reset the device might add complexity to the device, or introduce unreliability or a security flaw (e.g. of the reset fails, or can be deactivated, or can be circumvented). So, basing the characterisation time purely on transient response times and number of possible responses, might be simpler and preferred.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A device for generating a unique response to a challenge as an identifier for the device, the device comprising:
a plurality of structures, each structure exhibiting quantum mechanical confinement, and each structure being arranged to provide a first unique response when challenged with an electrical measurement, wherein an atomic makeup of the structure that defines the quantum mechanical confinement also defines the first unique response for each structure, such that each repeated challenge with the electrical measurement generates the unique response;
wherein the device is arranged to facilitate a challenge of at least two structures of the plurality in electrical combination to generate a second unique response for the challenged at least two structures, by facilitating an electrical measurement of an output of the at least two structures of the plurality in electrical combination; and
wherein the second unique response is derivable from the electrical measurement, and identifies the device through the challenge of the at least two structures of the plurality, and the plurality of structures are arranged such that an increase in the number of structures in such an arrangement leads to an exponential scaling in the number of possible challenges/responses to challenges.

2. The device of claim 1, wherein the unique response of the at least two structures being challenged in combination includes a measurable electrical characteristic different from a sum of the measurable electrical characteristic for each of the at least two structures being challenged in isolation.

3. The device of claim 2, wherein the unique response is configured to prevent determining the unique response of the at least two structures in combination from knowledge of each unique response of each measurable electrical characteristic of the at least two structures in isolation.

4. The device of claim 1, wherein facilitating an electrical measurement comprises facilitating an electrical measurement of the output of at least two of the structures when the structures are electrically connected or connectable in parallel and/or series.

5. The device of claim 1, wherein the plurality of structures are connected or connectable in parallel, the device comprising a number of such parallel-connected structures, connected together in series or parallel.

6. The device of claim 1, wherein the plurality of structures comprises a selected quantity N structures electrically connected or connectable together in series, and the device is arranged for selective measurement of the output of different series combinations of two to N of the N structures.

7. The device of claim 1, wherein the plurality of structures comprises a selected quantity N structures connected or connectable to N switches, the N structures being electrically connected or connectable to a selected quantity K structures connected or connectable to K switches, such that the number of possible measurements by selective operation of the switches is equal to $2^{N+K}$.

8. The device of claim 1, wherein the plurality of structures comprises a selected quantity N structures connected or connectable to N switches, arranged in parallel, such that the number of possible measurements by selective operation of the switches is equal to $2^N$.

9. The device of claim 8, wherein the plurality of structures comprises a selected quantity N structures connected or connectable to N switches, arranged in parallel, forms a unit, and there are a selected quantity M of these units in series, such that the number of possible measurements by selective operation of the switches is equal to $2^{N \times M}$.

10. The device of claim 1, wherein facilitating an electrical measurement comprises facilitating an electrical measurement of an output spectrum of the at least two structures of the plurality in electrical combination, measuring how the electrical output differs with different electrical inputs.

11. The device of claim 1, wherein:
the device is arranged to perform the measurement, or
wherein the device is connected or connectable to another device that is able to perform the measurement.

12. The device of claim 1, wherein the device is arranged to facilitate the physical altering of the atomic makeup of a structure through heating or electrical biasing to change a response provided by that structure when subsequently challenged.

13. A system for generating a unique response to a challenge, the system comprising a first device for challenging a second device to generate the unique response as an identifier for the second device, the second device comprising:
a plurality of structures, each structure exhibiting quantum mechanical confinement, and each structure being arranged to provide a first unique response when challenged with an electrical measurement, wherein an atomic makeup of the structure that defines the quantum mechanical confinement also defines the first unique response for each structure, such that each repeated challenge with the electrical measurement generates the unique response;
wherein the second device is arranged to facilitate a challenge of at least two structures of the plurality in electrical combination to generate a second unique response for the challenged at least two structures, by facilitating an electrical measurement of an output of the at least two structures of the plurality in electrical combination; and
wherein the first device is connected or connectable to the second device in order to perform the measurement, the second unique response being derivable from the electrical measurement, and identifies the second device through the challenge of the at least two structures of the plurality, and the plurality of structures are arranged such that an increase in the number of structures in such an arrangement leads to an exponential scaling in the number of possible challenges/responses to challenges.

14. A method of generating a unique response to a challenge as an identifier for a device, the method comprising:
challenging at least two structures of a plurality of structures in electrical combination, by electrically measuring an output of the at least two structures of the plurality in electrical combination being derivable from the electrical measurement, and identifying the second device through the challenge of the at least two structures of the plurality;
wherein each structure exhibits quantum mechanical confinement, and each structure provides a respective unique response when challenged with an electrical measurement, wherein an atomic makeup of the structure that defines the quantum mechanical confinement also defines the respective unique response, such that each repeated challenge of the at least two structures with the electrical measurement generates the unique response from each structure is repeatable via challenging with the electrical measurement, and the plurality of structures are arranged such that an increase in the number of structures in such an arrangement leads to an exponential scaling in the number of possible challenges/responses to challenges.

* * * * *